US012759303B2

(12) United States Patent
Yokoyama

(10) Patent No.: US 12,759,303 B2
(45) Date of Patent: Oct. 13, 2026

(54) INFORMATION PROCESSING APPARATUS, IMAGE PROCESSING APPARATUS, AND PROCESSING SYSTEM

(71) Applicant: CANON KABUSHIKI KAISHA, Tokyo (JP)

(72) Inventor: Tatsuyuki Yokoyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 18/607,081

(22) Filed: Mar. 15, 2024

(65) Prior Publication Data

US 2024/0316943 A1 Sep. 26, 2024

(30) Foreign Application Priority Data

Mar. 24, 2023 (JP) ................................ 2023-048778

(51) Int. Cl.
*B41J 2/175* (2006.01)

(52) U.S. Cl.
CPC .. *B41J 2/17566* (2013.01); *B41J 2002/17573* (2013.01)

(58) Field of Classification Search
CPC .................... B41J 2/17566; B41J 2002/17573
See application file for complete search history.

(56) References Cited

U.S. PATENT DOCUMENTS

| | | | | |
|---|---|---|---|---|
| 11,500,596 | B2 * | 11/2022 | Ogawa | G06F 3/1293 |
| 2016/0155129 | A1 * | 6/2016 | Ono | G06Q 30/0202 705/7.31 |
| 2023/0061231 | A1 * | 3/2023 | Shibata | G06F 3/1258 |
| 2024/0020070 | A1 * | 1/2024 | Niimoto | G06F 3/1204 |

FOREIGN PATENT DOCUMENTS

| | | | | |
|---|---|---|---|---|
| JP | 2006305942 | A | | 11/2006 |
| JP | 2015077812 | A | | 4/2015 |
| JP | 2022133803 | A | * | 9/2022 |

* cited by examiner

*Primary Examiner* — Sharon Polk
(74) *Attorney, Agent, or Firm* — Canon U.S.A., Inc. IP Division

(57) ABSTRACT

There is provided a system capable of appropriately managing a management target in an image processing apparatus. A smart phone (information processing apparatus) configured to be communicable with a printer (image processing apparatus) includes a management information acquisition unit configured to acquire management information of the printer from the printer, a camera application activation unit configured to acquire an image of a management target of the printer captured based on the management information, and a control command transmission unit configured to transmit a control command related to the management target to the printer, based on an analysis result of the image of the management target acquired by the camera application activation unit.

12 Claims, 8 Drawing Sheets

GUIDE DIALOG 1

GUIDE DIALOG 2

GUIDE DIALOG 3

INFORMATION PROCESSING APPARATUS, IMAGE PROCESSING APPARATUS, AND PROCESSING SYSTEM

BACKGROUND

Field of the Disclosure

The present disclosure relates to an information processing apparatus, an image processing apparatus, and a processing system.

Description of the Related Art

Until now, as a printer (printing apparatus) serving as an example of an image processing apparatus, a printer including a large-capacity ink tank for reserving ink has been discussed, for example, in Japanese Patent Application Laid-open No. 2006-305942. In general, the ink tank is designed to have a capacity larger than an ink cartridge, to reduce running costs of printing. However, unlike the ink cartridge to be replaced when the ink runs out, in a case of the ink tank, there is a case where the ink amount is increased before the ink runs out, for example, such that a user replenishes the ink tank with ink.

Thus, there may be some cases that it is difficult to appropriately grasp the amount of ink to appropriately manage the printer provided with the ink tank. In addition, as for the bottles purchased by users as consumable goods, since there are large capacity bottles that can be fully filled with ink, and mini-bottles that can be filled about half of the capacity of the large capacity bottles, it is difficult to accurately grasp the amount of ink after adding ink. In addition, if the ink tank is provided with a sensor for detecting the amount of ink, the initial costs of the printer increase while the running costs reduce. As a prior art to alleviative such an issue, for example, there is a technique of a printer provided with the ink tank discussed in Japanese Patent Application Laid-Open No. 2015-77812. More specifically, the technique discussed in Japanese Patent Application Laid-Open No. 2015-77812 resets an estimated ink remaining amount stored in a storage unit, in a case where the estimated ink remaining amount stored in the storage unit becomes a low remaining amount threshold value or less, to a reset value determined to be higher than the low remaining amount threshold value, in response to a user's reset instruction.

With the above-described technique discussed in Japanese Patent Application Laid-Open No. 2015-77812, it is necessary to reset the estimated remaining amount of the corresponding type of ink while taking the added amount of ink by the user into consideration. Thus, with the technique discussed in Japanese Patent Application Laid-Open No. 2015-77812, if the user performs an incorrect reset operation of the estimated remaining amount of ink, it is difficult to appropriately manage the ink (more specifically, remaining amount of ink), which is a management target in a printer serving as an image processing apparatus, which is an issue.

SUMMARY

Aspects of the present disclosure provide for a system that can appropriately manage the management target, in the image processing apparatus.

According to an aspect of the present disclosure, an information processing apparatus configured to communicate with an image processing apparatus includes an information acquisition unit configured to acquire management information of the image processing apparatus from the image processing apparatus, an image acquisition unit configured to acquire an image of a management target of the image processing apparatus captured based on the management information, and a transmission unit configured to transmit a control command related to the management target to the image processing apparatus, based on an analysis result of the image of the management target.

According to another aspect of the present disclosure, an image processing apparatus configured to communicate with an information processing apparatus includes a transmission unit configured to transmit management information of the image processing apparatus to the information processing apparatus, a reception unit configured to receive a control command related to a management target of the image processing apparatus, generated in the information processing apparatus based on the management information, and a control unit configured to restrict a reset operation of the management information during a period from a transmission of the management information by the transmission unit to a reception of the control command by the reception unit.

Further, the present disclosure comprises a control method for the above-described information processing apparatus, a control method for the above-described image processing apparatus, and a processing system including the above-described information processing apparatus and the above-described image processing apparatus.

Further features of the present disclosure will become apparent from the following description of embodiments with reference to the attached drawings.

DESCRIPTION OF THE EMBODIMENTS

Hereinbelow, embodiments of the present disclosure will be described with reference to the attached drawings.

First, a first embodiment will be described.

Figure 1:
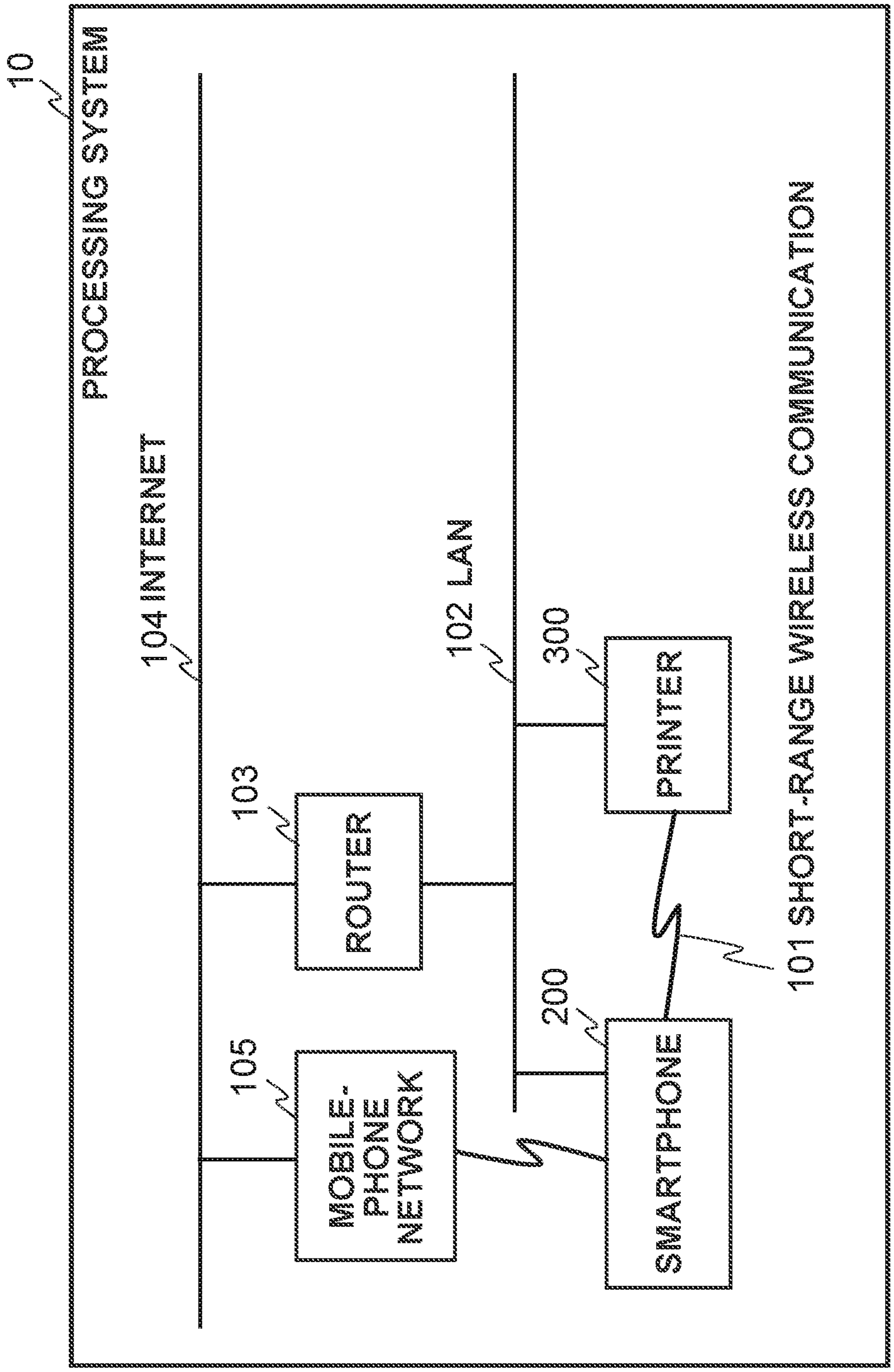
FIG. 1 is a block diagram schematically illustrating an example of a configuration of a processing system according to a first embodiment.

FIG. 1 is a block diagram schematically illustrating a configuration of a processing system 10 according to the first embodiment. As illustrated in FIG. 1, the processing system 10 includes a router 103, a smartphone 200, and a printer 300, which are communicably connected with each other via a local area network (LAN) 102 and the Internet 104. The printer 300 and the smartphone 200 are configured to be communicable with each other via a short-range wireless communication 101 or the LAN 102.

Further, the printer 300 and the smartphone 200 can connect to and communicate with the Internet 104 via the router 103 installed on the LAN 102. Further, the smartphone 200 can also connect to and communicate with the Internet 104 via a mobile-phone network 105.

In the present embodiment, the smartphone 200 is an information processing apparatus configured to be communicable with the printer 300 serving as an example of an image processing apparatus. Further, the printer 300 is an image processing apparatus configured to be communicable with the smartphone 200 serving as an example of an information processing apparatus.

In addition, the schematic configuration of the processing system 10 illustrated in FIG. 1 is merely an example, and even a processing system with a different configuration can be applied as long as the processing system can achieve the effect of the present disclosure. For example, the communication connection between the printer 300 and the smartphone 200 may be configured to use a connection medium other than the LAN 102. For example, as the connection medium, a wireless communication medium such as a Low Power Wide Area-network (LPWA) different from the wireless LAN, ZigBee, Bluetooth, or a short-range wireless communication, or a wired connection such as a universal serial bus (USB), or a medium such as an infrared communication, may be used. In addition, in place of the smartphone 200 serving as an example of an information processing apparatus, a desktop personal computer (PC) or a notebook-size PC serving as an information processing apparatus may be used.

Figure 2:
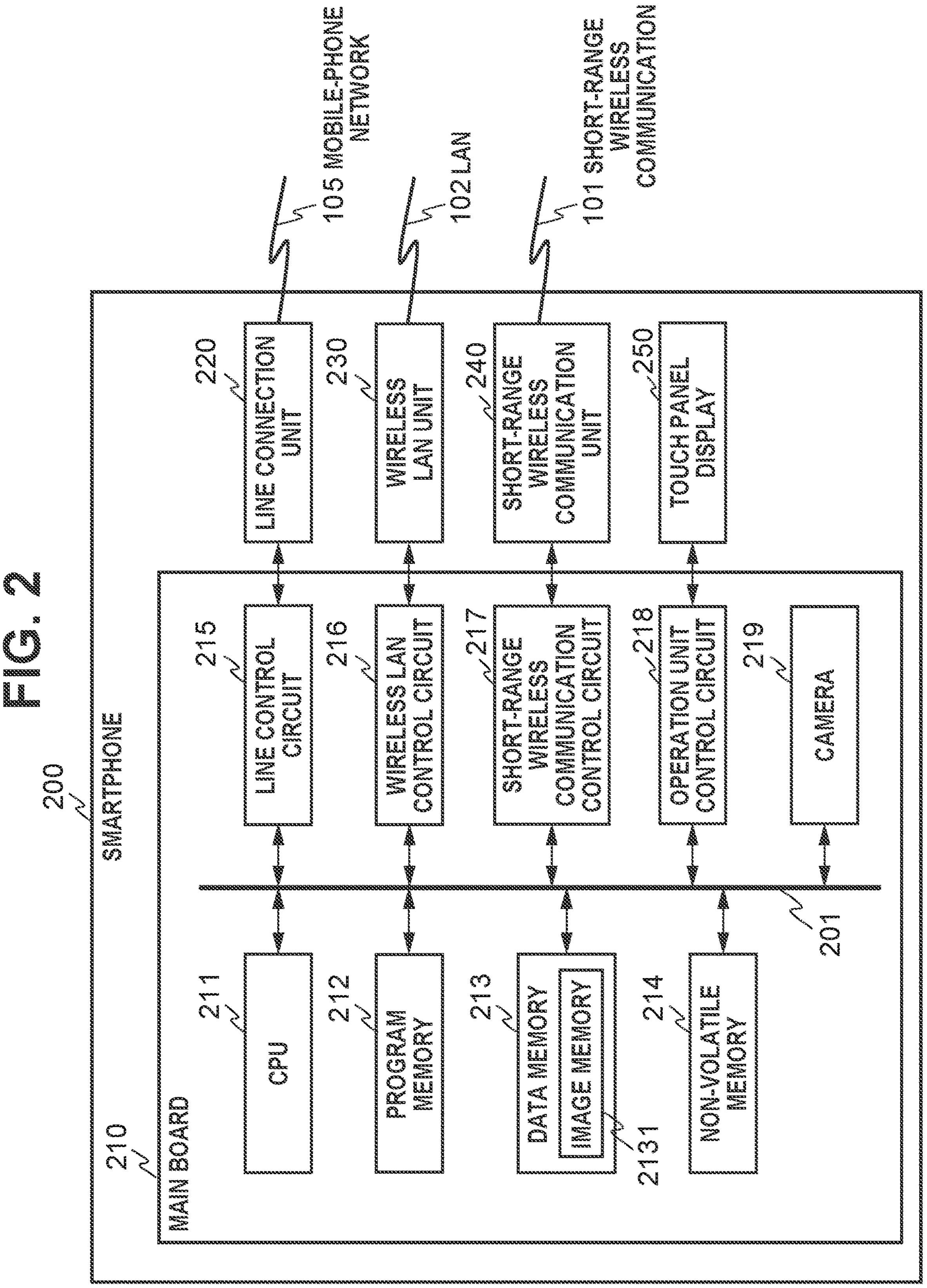
FIG. 2 is a block diagram illustrating an example of a hardware configuration of a smartphone serving as an example of an information processing apparatus according to the first embodiment.

FIG. 2 is a block diagram illustrating an example of a hardware configuration of the smartphone 200 serving as an example of an information processing apparatus according to the first embodiment. As illustrated in FIG. 2, the smartphone 200 includes a main board 210, a line connection unit 220, a wireless LAN unit 230, a short-range wireless communication unit 240, and a touch panel display 250.

The main board 210 performs overall control of the smartphone 200 and various kinds of processing. As illustrated in FIG. 2, the main board 210 includes a central processing unit (CPU) 211, a program memory 212, a data memory 213 including an image memory 2131, and a non-volatile memory 214. Further, as illustrated in FIG. 2, the main board 210 includes a line control circuit 215, a wireless LAN control circuit 216, a short-range wireless communication control circuit 217, an operation unit control circuit 218, a camera 219 (image capturing unit), and an internal bus 201.

The CPU 211 with a microprocessor configuration mounted on the main board 210 operates according to a control program stored in the program memory 212 with a read-only memory (ROM) configuration connected to the CPU 211 via the internal bus 201, and contents of the data memory 213 with a random access memory (RAM) configuration.

The CPU 211 can communicably connect to the mobile-phone network 105 by controlling the line connection unit 220 via the line control circuit 215, to perform a telephone call or to transmit and receive data. Further, the CPU 211 can communicably connect to the LAN 102 by controlling the wireless LAN unit 230 via the wireless LAN control circuit 216, to perform wireless LAN communication with other communication apparatuses communicably connected to the LAN 102.

Further, the CPU 211 performs the short-range wireless communication 101 by controlling the short-range wireless communication unit 240 via the short-range wireless communication control circuit 217. The CPU 211 can detect connections with other wireless communication apparatuses and can transmit and receive data to and from the other wireless communication apparatuses, through the short-range wireless communication 101.

The CPU 211 can perform a desired display on the touch panel display 250, and can receive an operation input from a user, by controlling the operation unit control circuit 218.

The CPU 211 can capture a desired image by controlling the camera 219. Then, the CPU 211 stores data of the captured image obtained by the image capturing of the camera 219, in the image memory 2131 in the data memory 213.

The data memory 213 stores various kinds of data including image data, and can newly store various kinds of data including image data. In addition to the image data captured by the camera 219, the CPU 211 can store image data obtained from an external apparatus via the mobile-phone network 105, the LAN 102, or the short-range wireless communication 101, in the image memory 2131. In an opposite manner, the CPU 211 can also transmit data stored in the data memory 213 to an external apparatus.

The non-volatile memory 214 is composed of, for example, a flash memory, and is a memory to store data desired to be held after power of the smartphone 200 is turned off. For example, the non-volatile memory 214 can store image data desired to be stored, and various kinds of application software implementing various functions of the smartphone 200, in addition to telephone book data, various kinds of communication connection information, and device information connected in the past.

Figure 3:
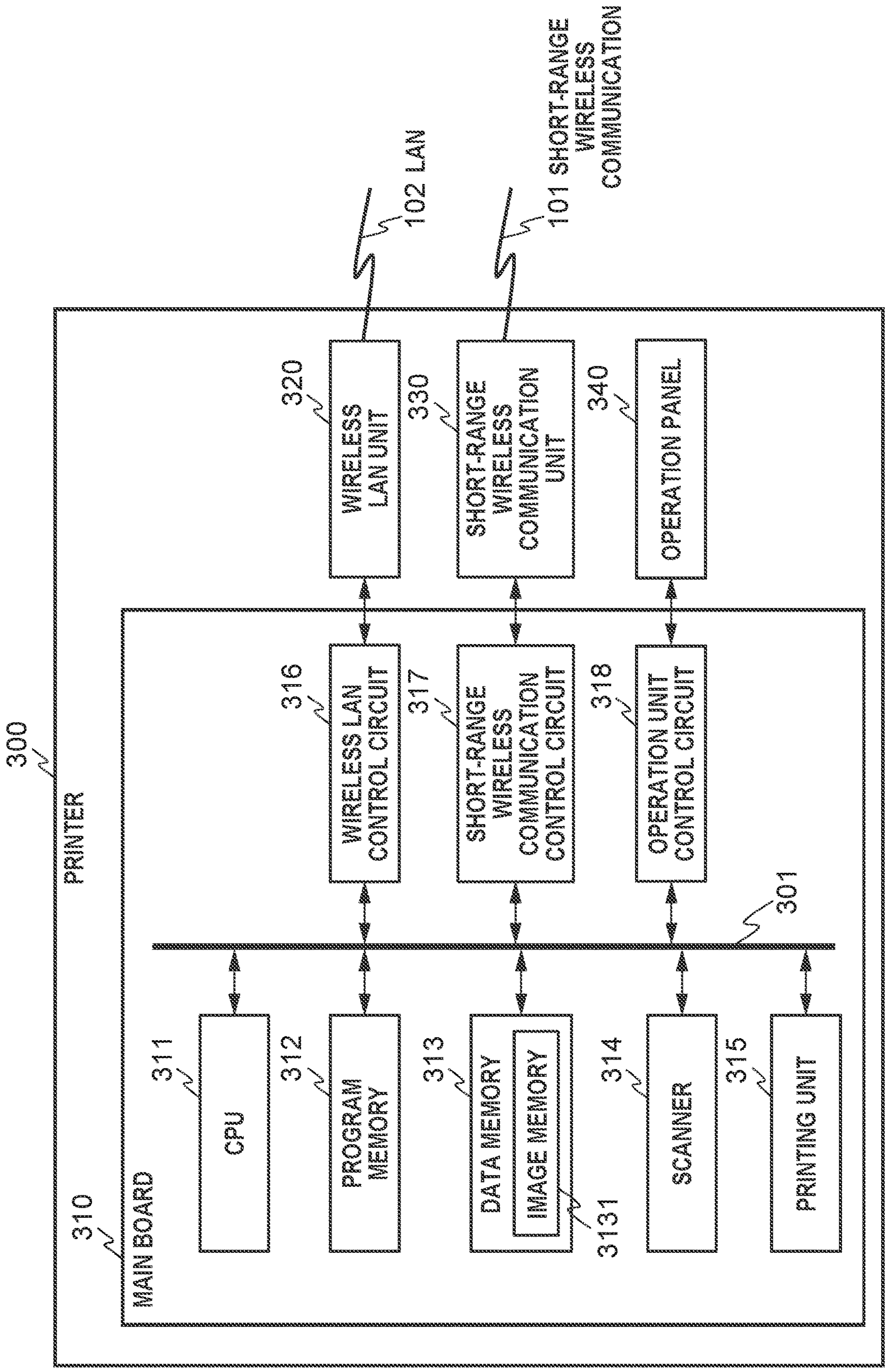
FIG. 3 is a block diagram illustrating an example of a hardware configuration of a printer serving as an example of an image processing apparatus according to the first embodiment.

FIG. 3 is a block diagram illustrating an example of a hardware configuration of the printer 300 serving as an example of an image processing apparatus according to the first embodiment. As illustrated in FIG. 3, the printer 300 includes a main board 310, a wireless LAN unit 320, a short-range wireless communication unit 330, and an operation panel 340.

The main board 310 performs overall control of the printer 300, and various kinds of processing. As illustrated in FIG. 3, the main board 310 includes a CPU 311, a program memory 312, a data memory 313 including an image memory 3131, a scanner 314, and a printing unit 315. Further, as illustrated in FIG. 3, the main board 310 includes a wireless LAN control circuit 316, a short-range wireless communication control circuit 317, an operation unit control circuit 318, and an internal bus 301.

The CPU 311 with a microprocessor configuration mounted on the main board 310 operates according to a control program stored in the program memory 312 with a ROM configuration connected to the CPU 311 via the internal bus 301, and contents of the data memory 313 with a RAM configuration.

The CPU 311 stores original image data obtained by controlling the scanner 314 to read an original document, in the image memory 3131 in the data memory 313. Further, the CPU 311 controls the printing unit 315 to perform print processing of printing an image stored in the image memory 3131 in the data memory 313, on a recording medium.

The CPU 311 communicably connects to the LAN 102 by controlling the wireless LAN unit 320 via the wireless LAN control circuit 316, to perform wireless LAN communication with other communication apparatuses communicably connected to the LAN 102. Further, the CPU 311 performs the short-range wireless communication 101 by controlling the short-range wireless communication unit 330 via the short-range wireless communication control circuit 317. The CPU 311 can detect connections with other wireless communication apparatuses and can transmit and receive data to and from the other wireless communication apparatuses, through the short-range wireless communication 101.

The CPU 311 can display a status of the printer 300 and a function selection menu on the operation panel 340, and can receive an operation input from a user, by controlling the operation unit control circuit 318. The operation panel 340 is provided with a back light, and the CPU 311 can control turning on and off the back light of the operation panel 340, via the operation unit control circuit 318. At this time, when the CPU 311 turns off the back light of the operation panel 340, the display of the operation panel 340 becomes difficult to view, but the power consumption of the printer 300 can be reduced.

Figure 4:
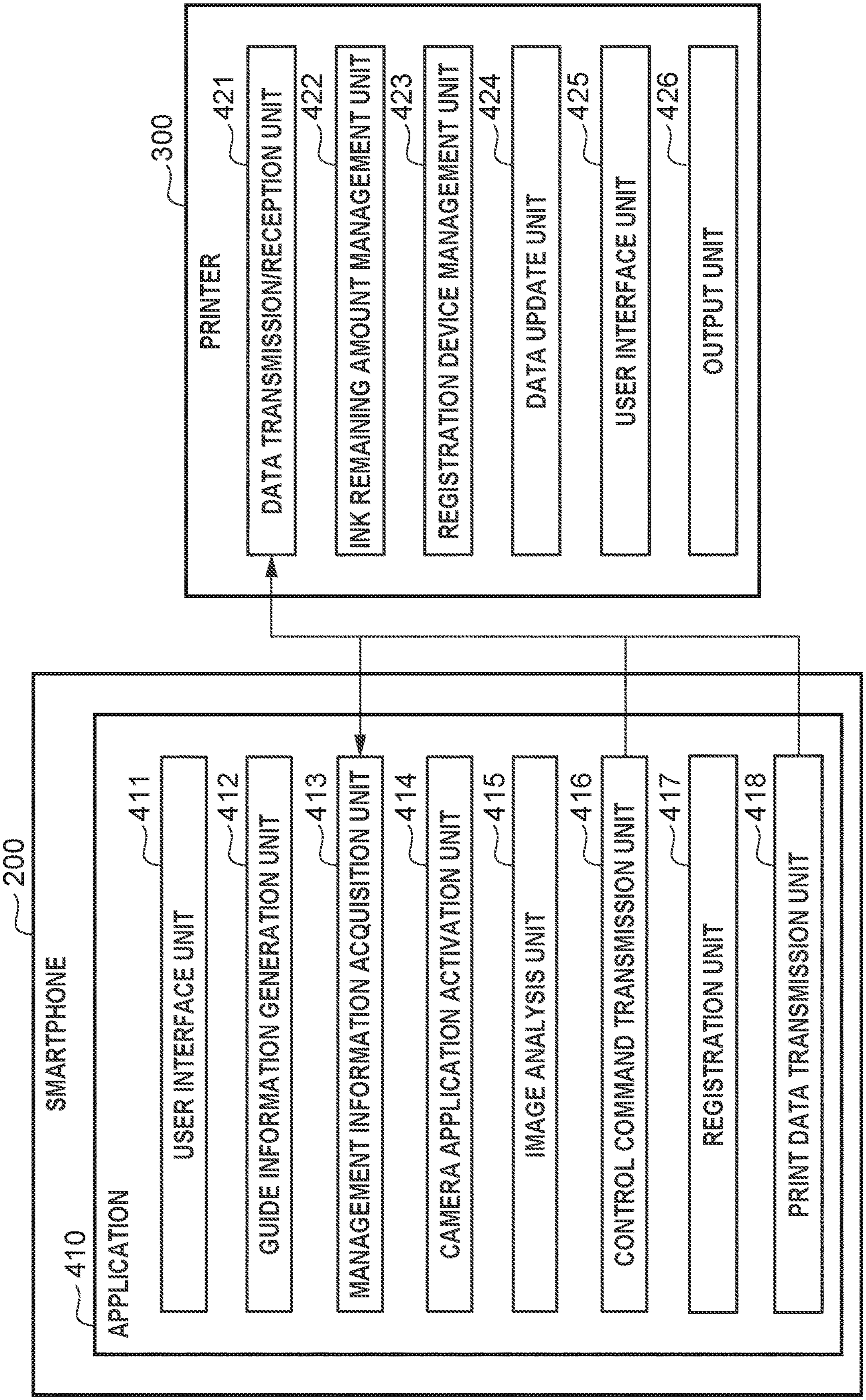
FIG. 4 is a block diagram illustrating an example of a software configuration of the smartphone serving as an example of an information processing apparatus, and a software configuration of the printer serving as an example of an image processing apparatus according to the first embodiment.

FIG. 4 is a block diagram illustrating an example of a software configuration of the smartphone 200 serving as an example of an information processing apparatus, and a software configuration of the printer 300 serving as an example of an image processing apparatus, according to the first embodiment.

Herein, an application 410 in the smartphone 200 illustrated in FIG. 4 is implemented, for example, by the CPU 211 of the smartphone 200 illustrated in FIG. 2 executing a program stored in the program memory 212 or the non-volatile memory 214. Further, each of units 421 to 426 of the printer 300 illustrated in FIG. 4 is implemented by, for example, the CPU 311 of the printer 300 illustrated in FIG. 3 executing a program stored in the program memory 312.

First, the smartphone 200 in FIG. 4 will be described.

The application 410 operates on the smartphone 200, to perform various kinds of controls to the printer 300, a notification of an error occurring on the printer 300, and a guide. The application 410 includes a user interface unit 411 (display unit), a guide information generation unit 412, a management information acquisition unit 413, a camera application activation unit 414, an image analysis unit 415, a control command transmission unit 416, a registration unit 417, and a print data transmission unit 418. Hereinbelow, the units 411 to 418 in the application 410 of the smartphone 200 will be described.

The application 410 displays a management screen on the user interface unit 411, to display a notification screen for an error occurring on the printer 300, and a guide screen. Further, in a case where a predetermined condition is satisfied, the application 410 activates a camera application of the smartphone 200 via the camera application activation unit 414.

The management information acquisition unit 413 is an information acquisition unit for acquiring, from the printer 300, management information including error information of the printer 300, and consumable good information such as an ink remaining amount. The guide information generation unit 412 generates guide information depending on a status of the printer 300, based on the management information acquired by the management information acquisition unit 413. The guide information generated by the guide information generation unit 412 is displayed on the user interface unit 411.

The camera application activation unit 414 activates the camera application of the smartphone 200, following an instruction from the user interface unit 411 displaying the guide information. The camera application activation unit 414 ends the camera application when the camera 219 of the smartphone 200 has captured an image of a management target of the printer 300, which is an ink unit for storing ink that is an example of a consumable good in the present embodiment. In this case, the camera application activation unit 414 is an image acquisition unit that acquires an image of the management target of the printer 300, captured by the image capturing. Then, the camera application activation unit 414 outputs the acquired image of the management target of the printer 300 to the image analysis unit 415.

The image analysis unit 415 analyzes the image of the management target of the printer 300 acquired from the camera application activation unit 414, which is an ink unit for storing ink that is an example of a consumable good in the present embodiment, and calculates an estimation value of the ink remaining amount of the printer 300. Then, the image analysis unit 415 outputs the calculated estimation value of the ink remaining amount of the printer 300 to the user interface unit 411, as an analysis result.

The control command transmission unit 416 is a transmission unit configured to transmit, to the printer 300, a control command related to the ink, which is an example of a management target of the printer 300, following an instruction of the user interface unit 411 that has received the image analysis result of the image from the image analysis unit 415. More specifically, in the present embodiment, the control command transmission unit 416 transmits, as a control command, a reset command to reset the ink remaining amount to a data transmission/reception unit 421 of the printer 300. In the present embodiment, the control command transmission unit 416 may transmit a reset command corresponding to each color of ink, or a reset command only corresponding to a color of ink of which an ink error is detected, based on the estimation value of the ink remaining amount by the image analysis unit 415.

The registration unit 417 searches for the printer 300 at the time of activation of the application 410, and registers the found printer 300. At this time, the smartphone 200 is registered to a registration device management unit 423 of the printer 300 as a registration device.

The print data transmission unit 418 generates print data, and transmits the generated print data to the data transmission/reception unit 421 of the printer 300. In this way, the printer 300 can print the print data received by the data transmission/reception unit 421.

Next, the printer 300 in FIG. 4 will be described.

The printer 300 includes the data transmission/reception unit 421, an ink remaining amount management unit 422, the registration device management unit 423, a data update unit 424, a user interface unit 425, and an output unit 426. Hereinbelow, the units 421 to 426 in the printer 300 will be described.

The data transmission/reception unit 421 transmits, to the smartphone 200, the management information related to the management target of the printer 300, which is a ink unit storing ink serving as an example of a consumable good in the present embodiment, in response to a request from the application 410 of the smartphone 200. More specifically, in the present embodiment, the data transmission/reception unit 421 transmits the information related to the ink remaining amount managed by the ink remaining amount management unit 422, as the management information. Further, the data transmission/reception unit 421 receives a control command related to ink, which is an example of a management target of the printer 300, transmitted from the control command transmission unit 416 of the smartphone 200. More specifically, in the present embodiment, the data transmission/reception unit 421 receives, as a control command, a reset command to reset the ink remaining amount. Further, the data transmission/reception unit 421 receives the print data transmitted from the print data transmission unit 418 of the smartphone 200.

The registration device management unit 423 records the smartphone 200 registering the printer 300 itself as a registration device, and manages information of the registration device. In this case, in a case where the printer 300 itself is registered by a plurality of devices, the registration device management unit 423 records and manages the individual devices, each as a registration device.

The data update unit 424 performs processing of performing resetting, or the like of the ink remaining amount managed by the ink remaining amount management unit 422, based on the reset command to reset the ink remaining amount received by the data transmission/reception unit 421.

In the present embodiment, the user interface unit 425 is assumed to have a segment liquid crystal display that can only perform minimum guide for the purpose of cost saving. Accordingly, the user interface unit 425 is assumed to be able to display whether an error has occurred, and text information of 32 characters to express a release method of the error, on the segment liquid crystal display.

The output unit 426 performs a print-out based on the print data received by the data transmission/reception unit 421 from the print data transmission unit 418 of the smartphone 200.

Figure 5:
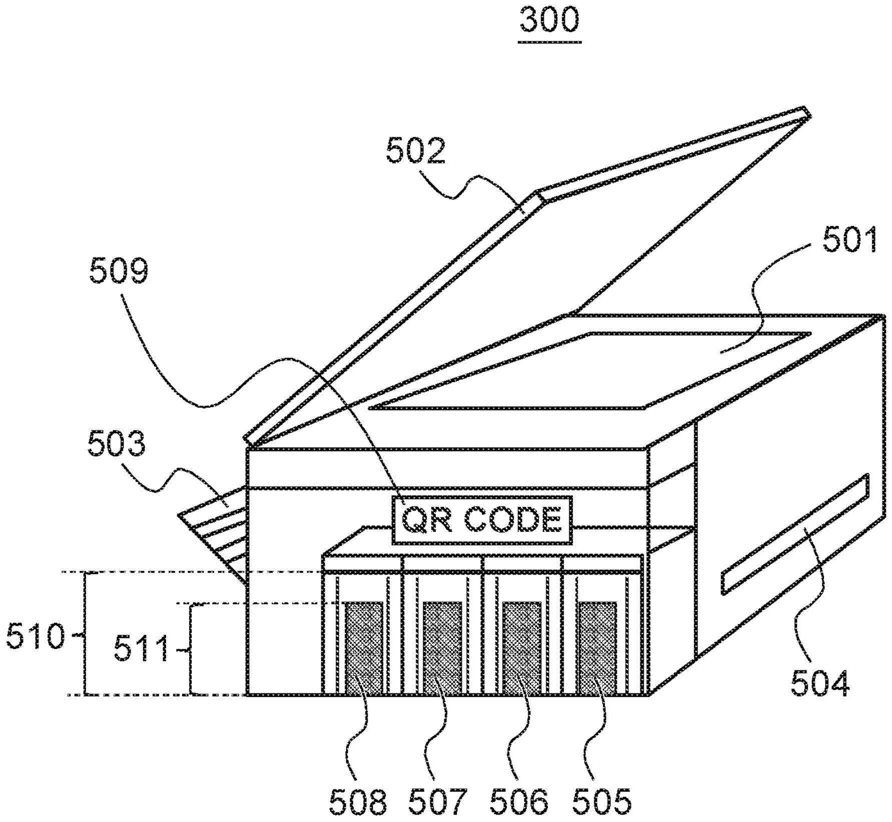
FIG. 5 is a diagram illustrating an example of an external appearance of the printer serving as an example of an image processing apparatus according to the first embodiment.

FIG. 5 is a diagram illustrating an example of an external appearance of the printer 300 serving as an example of an image processing apparatus according to the first embodiment. As illustrated in FIG. 5, the printer 300 includes a platen 501, a platen pressing plate 502, a print sheet insertion portion 503, a print sheet discharge opening 504, ink units 505 to 508, and a quick response code (QR Code®) 509.

In the example illustrated in FIG. 5, the printer 300 is assumed to be a multifunction printer (MFP) including a function of the scanner 314 and other functions, and to be a type of the printer in which the ink units 505 to 508 are replenished with inks from the ink bottles.

The platen 501 is a transparent glass platform. The platen 501 is used when a document is placed and read with the scanner 314. The platen pressing plate 502 is a cover to press the document so that the document does not float from the platen 501, and external light does not enter the scanner 314, when the scanner 314 reads the document.

The print sheet insertion portion 503 is an insertion portion to set various sizes of print sheets.

The print sheets set on the print sheet insertion portion 503 are conveyed one by one to the printing unit 315, printed by the printing unit 315 in a desired manner, and discharged through the print sheet discharge opening 504.

The ink units 505 to 508 are an ink unit group storing different types of inks used for printing by the printing unit 315. More specifically, in the present embodiment, the ink unit 505 is a unit to store black ink. The ink unit 506 is a unit to store cyan ink. The ink unit 507 is a unit to store magenta ink. The ink unit 508 is a unit to store yellow ink. Each of the ink units 505 to 508 is configured in such a manner that a user can visually check an ink remaining amount 511 through an ink remaining amount window 510 provided on a side surface. In a case where the ink remaining amount 511 is not enough, a user can purchase a commercially available ink bottle, to replenish (refill) a corresponding ink unit with ink.

As a detection method of the ink remaining amount 511, the printer 300 according to the present embodiment employs a count-down method of the ink remaining amount 511 using the dot counting of discharged ink from a filled up state. Further, at the bottom of each of the ink units 505 to 508, a contact type sensor for detecting the ink remaining amount is provided to accurately detect a no-ink error by detecting the ink remaining amount 511. When the no-ink error has occurred, it is possible to clear the error by replenishing (refilling) the ink unit with the corresponding type of ink, but at this time, the processing to reset the ink remaining amount by the remaining amount of the replenishment ink is required. It is also possible for a user to reset the ink remaining amount by operating the user interface unit 425 of the printer 300 following the guide displayed on the user interface unit 425 of the printer 300. However, since the user interface unit 425 can display only the minimum information as described above with reference to FIG. 4, a user may possibly perform an erroneous reset operation of the ink remaining amount. Thus, the present embodiment is configured in such a manner that the application 410 of the smartphone 200 transmits the reset command related to the ink remaining amount, which is an example of the management target in the printer 300, to the printer 300 side.

The QR code 509 is a marker used to identify the ink units 505 to 508 each storing a different color ink, which is an example of the management target in the printer 300. Further, the QR code 509 can be, for example, an indicator (marker) to capture an image when an area including the ink units 505 to 508 is captured by the camera application of the smartphone 200, to increase the accuracy of the image capturing by a user. In addition, in the present embodiment, the example of increasing the image capturing accuracy using the QR code 509 is described, but providing the QR code 509 is not requisite. Further, as the example of the maker described above, the example of the QR code 509 is described, but a marker other than the QR code 509 may be provided on the ink units, to increase the image capturing accuracy.

Figure 6:
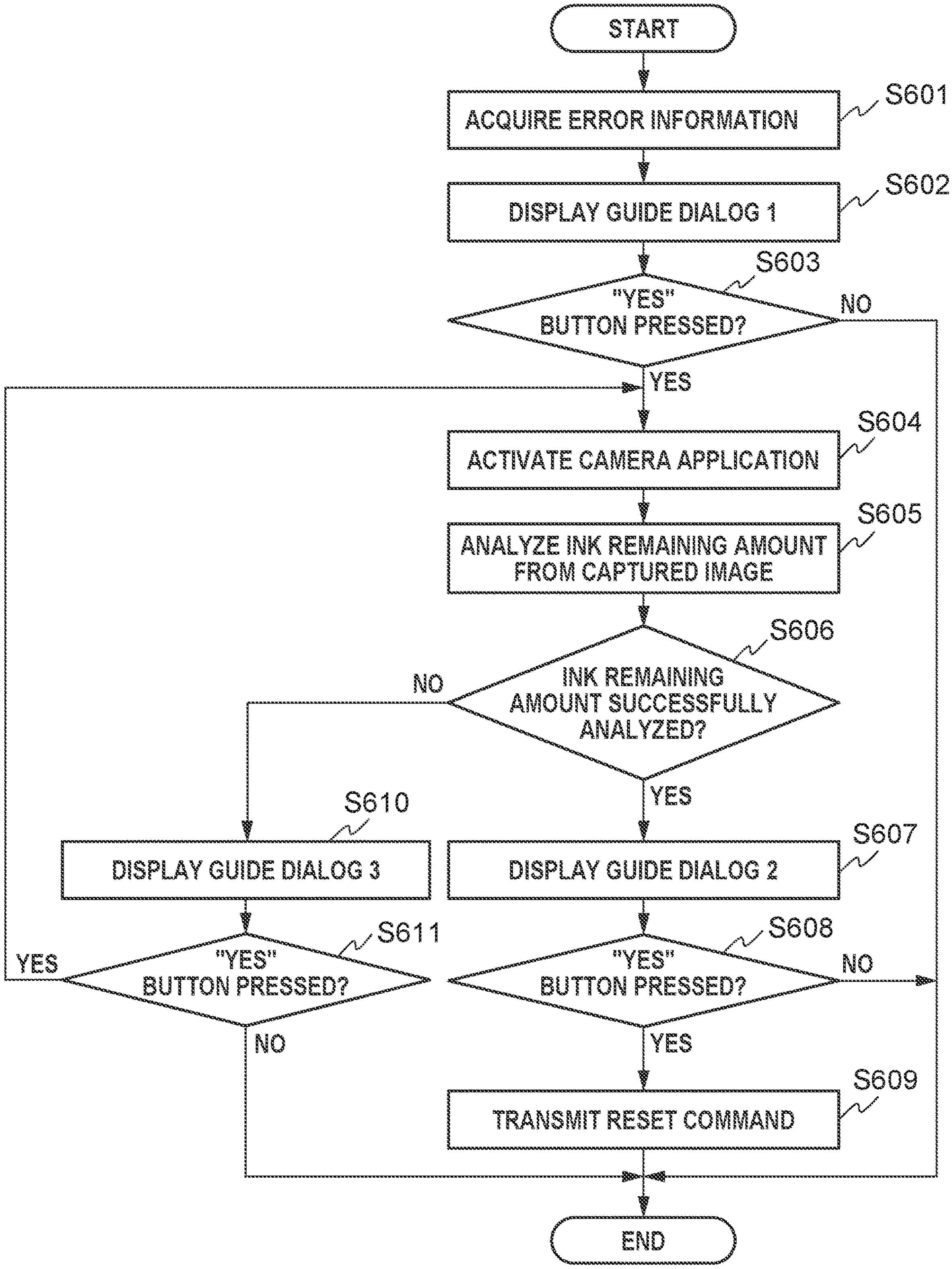
FIG. 6 is a flowchart illustrating an example of a processing procedure in a control method of the smartphone serving as an example of an information processing apparatus according to the first embodiment.

FIG. 6 is a flowchart illustrating an example of a processing procedure in a control method of the smartphone 200 serving as an example of an information processing apparatus according to the first embodiment. More specifically, FIG. 6 is a flowchart illustrating an example of a processing procedure in a control method of the smartphone 200 up to the reset command issuing processing in the application 410 of the smartphone 200 illustrated in FIG. 4.

First, in step S601, the management information acquisition unit 413 acquires management information of the management target of the printer 300 (here, ink units each storing a different color ink serving as an example of a consumable good), from the data transmission/reception unit 421 of the printer 300. More specifically, in the example illustrated in FIG. 6, the management information acquisition unit 413 acquires error information when the no-ink error has occurred in the printer 300, as the management information.

Next, in step S602, the guide information generation unit 412 analyzes the error information acquired in step S601 to generate guide information, and causes the user interface unit 411 to display a guide dialog 1.

Figure 7A:
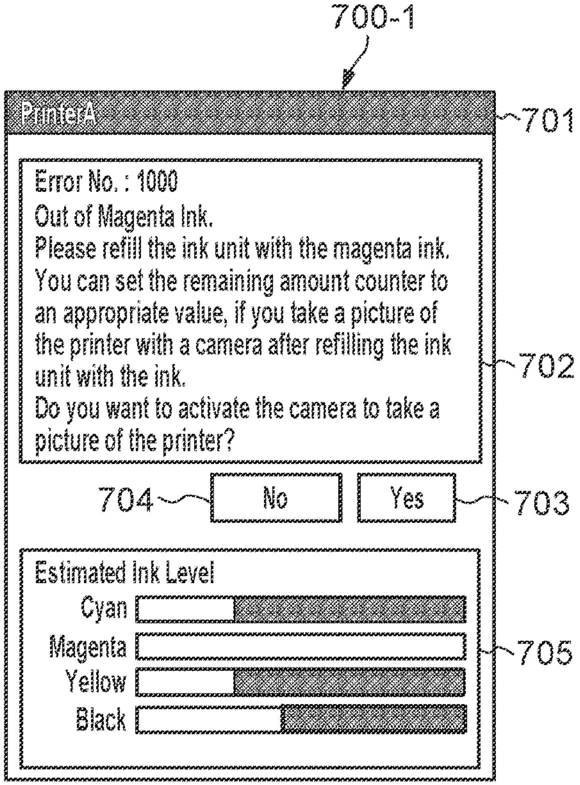
FIGS. 7A to 7C are diagrams each illustrating a display example of a guide dialog displayed on a user interface unit of the smartphone serving as an example of an information processing apparatus according to the first embodiment.
Figure 7B:
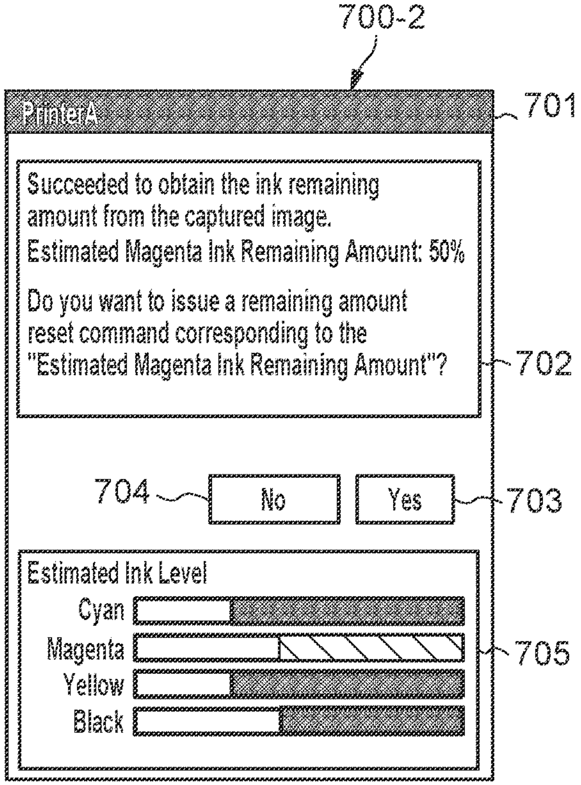
Figure 7C:
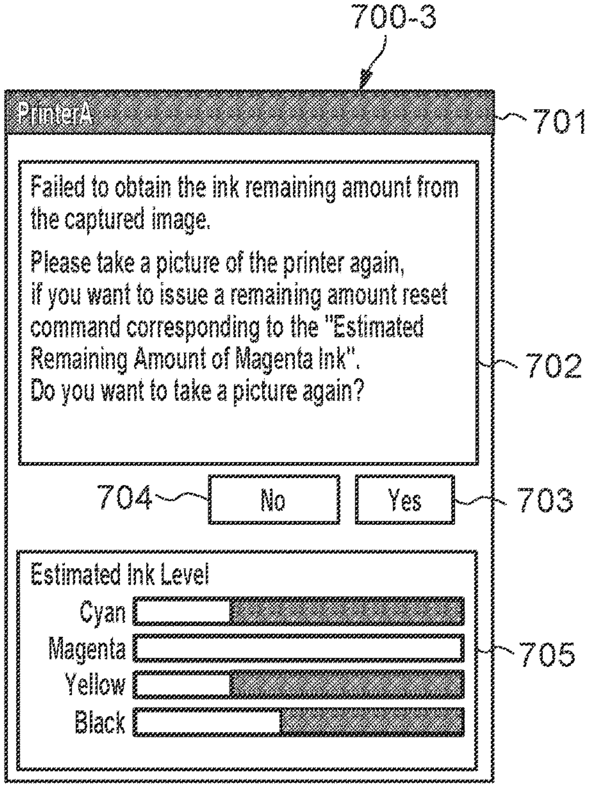

FIGS. 7A to 7C are diagrams illustrating display examples of guide dialogs 700 (guide dialogs 700-1, 700-2, and 700-3) displayed on the user interface unit 411 of the smartphone 200 serving as an example of an information processing apparatus according to the first embodiment.

FIG. 7A illustrates an example of the guide dialog 700-1 corresponding to the guide dialog 1 displayed in step S602. The guide dialog 700-1 illustrated in FIG. 7A includes a title bar 701, a message display area 702, a "Yes" button 703, a "No" button 704, and an ink information display area 705. The title bar 701 is a display area for displaying an application name, a printer name, and the like. The message display area 702 is a display area for displaying a message indicating a status of the printer 300, based on the analyzed result of the management information of the printer 300 acquired by the management information acquisition unit 413. The ink information display area 705 is a display area for displaying information related to the ink serving as an example of the management target of the printer 300, based on the analysis result of the management information of the printer 300 acquired by the management information acquisition unit 413. In the present embodiment, in step S601, the management information acquisition unit 413 acquires error information in a case where a no-magenta-ink error has occurred in the printer 300, and the message display area 702 illustrated in FIG. 7A displays a message indicating a no-magenta-ink error status. Further, the ink information display area 705 illustrated in FIG. 7A performs a remaining amount display indicating a status of the magenta ink remaining amount 0%.

Now, the description returns to FIG. 6.

When the processing in step S602 ends, the processing proceeds to step S603. In step S603, the user interface unit 411 determines whether the "Yes" button 703 is pressed on the guide dialog 1 (guide dialog 700-1 in FIG. 7A) displayed in step S602. In a case where the "Yes" button 703 is not pressed and the "No" button 704 is pressed (NO in step 603), the processing of the flowchart in FIG. 6 ends.

On the other hand, in step S603, in a case where the "Yes" button 703 is pressed (YES in step S603), the processing proceeds to step S604.

In step S604, the camera application activation unit 414 activates a camera application set as a default of the smartphone 200, in response to an instruction from the user interface unit 411.

Next, in step S605, the camera application activation unit 414 acquires an image of the management target of the printer 300 (here, ink units each storing a different color ink serving as an example of a consumable good) captured by the user using the camera application. Next, the image analysis unit 415 analyzes the image of the management target of the printer 300 (here, ink units each storing a different color ink serving as an example of a consumable good) acquired from the camera application activation unit 414, to analyze the ink remaining amount of the printer 300. For example, the image analysis unit 415 extracts, from the image obtained by the image capturing, an object of the ink remaining amount window 510 and an object of the ink remaining amount 511 illustrated in FIG. 5, to perform analysis of calculating a percentage of the ink remaining amount 511 based on the ratio in height between the extracted objects. Further, for example, the image analysis unit 415 may extract, from the image obtained by the image capturing, an object of the ink remaining amount window 510 (including ink remaining amount 511) illustrated in FIG. 5 to perform image analysis thereof using artificial intelligence (AI), and may acquire the above-described percentage of the ink remaining amount 511. Further, the image analysis unit 415 may perform image processing, such as a contrast adjustment, so as to be able to easily analyze the ink remaining amount 511, in consideration of the stains on the ink remaining amount window 510 illustrated in FIG. 5, and the brightness of the image capturing environment.

Next, in step S606, the image analysis unit 415 determines whether the image analysis unit 415 has been able to analyze the ink remaining amount of the printer 300.

In step S606, in a case where the image analysis unit 415 has been able to analyze the ink remaining amount of the printer 300 (YES in step S606), the processing proceeds to step S607.

In step S607, the guide information generation unit 412 generates guide information based on the ink remaining amount analyzed by the image analysis unit 415 in step S605, and causes the user interface unit 411 to display a guide dialog 2.

FIG. 7B illustrates an example of a guide dialog 700-2 corresponding to the guide dialog 2 displayed in step S607. In the guide dialog 700-2 illustrated in FIG. 7B, the same configurations as those of the guide dialog 700-1 illustrated in FIG. 7A are assigned the same symbols, and the detailed descriptions thereof are omitted. Specifically, the guide dialog 700-2 illustrated in FIG. 7B illustrates a guide dialog displayed based on the ink remaining amount 511 analyzed by the image analysis unit 415. In the present embodiment, the magenta ink remaining amount is subjected to replenishment to 50% as the result of the analysis by the image analysis unit 415, and the message display area 702 illustrated in FIG. 7B displays a message to confirm whether to issue a remaining amount reset command corresponding to the remaining amount of the magenta ink. Further, the ink information display area 705 illustrated in FIG. 7B displays the remaining amount bar of the magenta ink with hatched lines so as to make it clear that the remaining amount bar of the magenta ink indicates the remaining amount acquired from the captured image.

Now, the description returns to FIG. 6.

When the processing in step S607 ends, the processing proceeds to step S608. In step S608, the user interface unit 411 determines whether the "Yes" button 703 is pressed in the guide dialog 2, which is the guide dialog 700-2 illustrated in FIG. 7B, displayed in step S607. In step S608, in a case where the "Yes" button 703 is not pressed and the "No" button 704 is pressed (NO in step S608), the processing of the flowchart illustrated in FIG. 6 ends.

On the other hand, in step S608, in a case where the "Yes" button 703 is pressed (YES in step S608), the processing proceeds to step S609.

In step S609, the control command transmission unit 416 transmits (issues) a control command related to the ink of the printer 300 to the printer 300, following an instruction of the user interface unit 411 that has received the analysis result of the image from the image analysis unit 415. More specifically, in the present embodiment, the control command transmission unit 416 transmits, as a control command, a reset command to reset the magenta ink remaining amount, to the data transmission/reception unit 421 of the printer 300. More specifically, in the present embodiment, the control command transmission unit 416 transmits a reset command to update the setting of the magenta ink remaining amount to 50%.

On the other hand, in step S606, in a case where the image analysis unit 415 has not been able to analyze the ink remaining amount of the printer 300 (NO in step S606), the processing proceeds to step S610.

In step S610, the guide information generation unit 412 generates guide information based on that the image analysis unit 415 has not been able to analyze the ink remaining amount in step S605, and causes the user interface unit 411 to display a guide dialog 3

FIG. 7C illustrates an example of a guide dialog 700-3 corresponding to the guide dialog 3 displayed in step S610. In the guide dialog 700-3 illustrated in FIG. 7C, the same configurations as those of the guide dialog 700-1 illustrated in FIG. 7A are assigned the same symbols, and the detailed descriptions thereof are omitted. Specifically, the guide dialog 700-3 illustrated in FIG. 7C illustrates a guide dialog displayed when the ink remaining amount analysis by the image analysis unit 415 from the captured image has failed. The guide dialog 700-3 illustrated in FIG. 7C displays a message to confirm whether to perform the image capturing again in the message display area 702 illustrated in FIG. 7C, because the image analysis unit 415 has failed the analysis of the ink remaining amount from the captured image.

Now, the description returns to FIG. 6.

When the processing in step S610 ends, the processing proceeds to step S611. In step S611, the user interface unit 411 determines whether the “Yes” button 703 is pressed in the guide dialog 3, which is the guide dialog 700-3 illustrated in FIG. 7C, displayed in step S610. In step S611, in a case where the “Yes” button 703 is pressed (YES in step S611), the processing returns to step S604, and repeats the processing in step S604 and the subsequent steps.

On the other hand, in step S611, in a case where the “Yes” button 703 is not pressed and the “No” button 704 is pressed (NO in step S611), or the processing in step S609 ends, the processing of the flowchart illustrated in FIG. 6 ends.

As described above, in the first embodiment, the management information acquisition unit 413 of the smartphone 200 serving as an example of an information processing apparatus acquires the management information of the printer 300 from the printer 300 serving as an example of an image processing apparatus. Then, in the first embodiment, the camera application activation unit 414 of the smartphone 200 acquires the image of the management target of the printer 300 captured based on the management information acquired by the management information acquisition unit 413. Then, in the first embodiment, the control command transmission unit 416 of the smartphone 200 transmits, to the printer 300, a control command related to the management target, based on the analysis result of the image of the management target of the printer 300 acquired by the camera application activation unit 414.

With such a configuration, the printer 300 can appropriately manage the management target. In this way, it is possible to suppress management mistakes of management targets by the user.

Specifically, in the first embodiment, in the case where the no-ink error has occurred in the printer 300, the application 410 of the smartphone 200 detects the no-ink error to perform the guide. Then, following the guide of the application 410, the user replenishes the ink unit with the ink of which the no-ink error has occurred, and performs image capturing by the camera application activated from the application 410, and then the smartphone 200 performs the following processing. Specifically, the application 410 of the smartphone 200 analyzes the image obtained by the image capturing, and issues, to the printer 300, the reset command corresponding to the remaining amount of ink subjected to replenishment (refill). Thus, the user can appropriately manage the ink in the printer 300, without caring about the remaining amount of the ink subjected to replenishment.

Next, a second embodiment will be described. In addition, in the second embodiment described below, items common with those in the first embodiment are not described, and items different from those in the first embodiment will be described.

In the first embodiment described above, in the case where the no-ink error has occurred in the printer 300, the application 410 of the smartphone 200 detects the no-ink error and guides the user to issue a reset command of the ink remaining amount from the application 410. In this case, the reset of the ink remaining amount can be operated also from the operation panel 340 of the printer 300. For this reason, in a case where the user resets the ink remaining amount from the operation panel 340, there may be a possibility of being unable to appropriately manage the ink remaining amount of the printer 300, due to a user’s operation mistake. In response, in the second embodiment, a description is given of an embodiment taking into consideration the prevention of the operation mistake by the user from the operation panel 340 of the printer 300.

A schematic configuration of a processing system according to the second embodiment is similar to that of the processing system 10 according to the first embodiment illustrated in FIG. 1. Further, a hardware configuration of the smartphone 200 according to the second embodiment is similar to that of the smartphone 200 according to the first embodiment illustrated in FIG. 2. Further, a hardware configuration of the printer 300 according to the second is similar to that of the printer 300 according to the first embodiment illustrated in FIG. 3. Further, software configurations of the smartphone 200 and the printer 300 according to the second embodiment are similar to those of the smartphone 200 and the printer 300 according to the first embodiment illustrated in FIG. 4.

Figure 8:
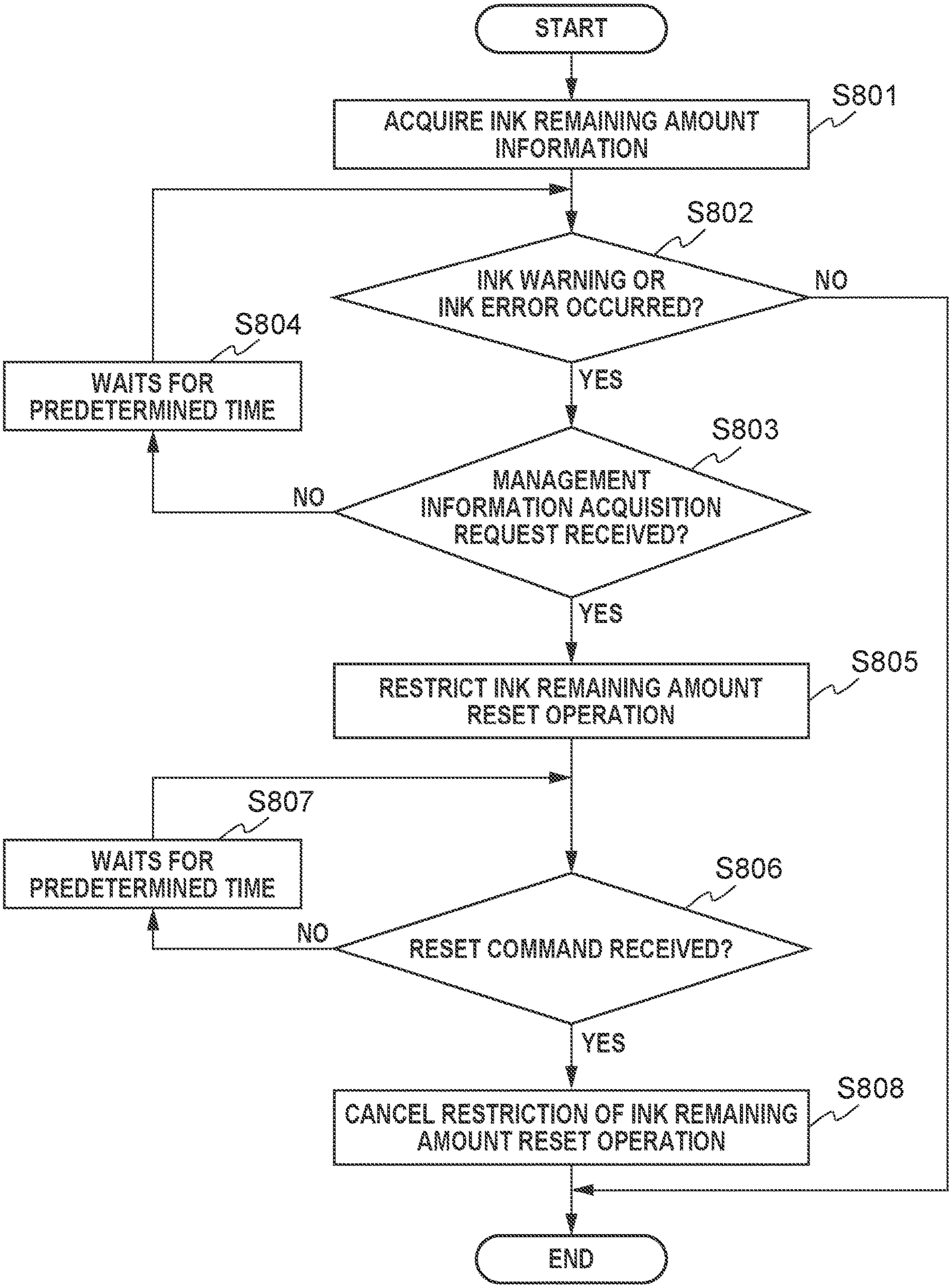
FIG. 8 is a flowchart illustrating an example of a processing procedure in a control method of a printer serving as an example of an image processing apparatus according to a second embodiment.

FIG. 8 is a flowchart illustrating an example of a processing procedure in a control method of the printer 300 serving as an example of an image processing apparatus according to the second embodiment. More specifically, FIG. 8 is a flowchart illustrating processing of checking whether a management information acquisition request from a registration device is generated in a case where no-ink error has occurred in the printer 300, and restricting a reset operation from the operation panel 340 of the printer 300. In addition, in the present embodiment, at a stage at which the processing of the flowchart illustrated in FIG. 8 starts, the smartphone 200 is registered in advance as a registration device in the registration device management unit 423 of the printer 300.

First, in step S801, the ink remaining amount management unit 422 acquires ink remaining amount information managed thereby.

Next, in step S802, the ink remaining amount management unit 422 determines whether an ink warning or an ink error has occurred, based on the ink remaining amount information acquired in step S801.

In step S802, in a case where the ink warning or the ink error has occurred (YES in step S802), the processing proceeds to step S803.

In step S803, after acquiring the information about the registration device from the registration device management unit 423, the data transmission/reception unit 421 determines whether a management information acquisition request is received from the smartphone 200, which is a registration device, after the ink warning or the ink error has occurred.

In step S803, in a case where the data transmission/reception unit 421 has not received the management information acquisition request from the smartphone 200, which is a registration device, after the ink warning or the ink error has occurred (NO in step S803), the processing proceeds to step S804.

In step S804, the printer 300 waits for a predetermined time. Then, when the waiting for the predetermined time has ended, the processing returns to step S802, and the processing in step S802 and the subsequent steps are performed again.

On the other hand, in step S803, in a case where the data transmission/reception unit 421 has received the management information acquisition request from the smartphone 200, which is a registration device, after the ink warning or the ink error has occurred (YES in step S803), the processing proceeds to step S805.

In step S805, first, the data transmission/reception unit 421 transmits, to the smartphone 200, the management information related to the ink remaining amount of the printer 300. Then, the printer 300 restricts the operation panel 340 so that the reset operation of the management information related to the ink remaining amount cannot be performed therefrom.

Next, in step S806, the data transmission/reception unit 421 determines whether a reset command for resetting the ink remaining amount has been received from the smartphone 200, which is a registration device.

In step S806, in a case where the reset command has not been received from the smartphone 200 (NO in step S806), the processing proceeds to step S807.

In step S807, the printer 300 waits for a predetermined time. Then, when the waiting for the predetermined time has ended, the processing returns to step S806.

On the other hand, in step S806, in a case where the reset command has been received from the smartphone 200 (YES in step S806), the processing proceeds to step S808.

In step S808, the printer 300 cancels the restriction of the reset operation so that the reset operation of the management information related to the ink remaining amount from the operation panel 340 becomes operable.

In a case where the processing in step S808 ends, or the ink remaining amount management unit 422 determines in step S802 that the ink warning or the ink error has not occurred (NO in step S802), the processing of the flowchart illustrated in FIG. 8 ends.

In addition, in the present embodiment, the description is given of the example of restricting the reset operation of the management information related to the ink remaining amount from the operation panel 340 in the case where the condition is satisfied, but the present disclosure is not limited thereto. For example, a message to prompt a user to perform a reset operation from the smartphone 200 before the reset operation may be displayed on the operation panel 340.

Further, in the present embodiment, the description is given of the example of restricting the reset operation of the management information related to the ink remaining amount, on condition that the management information acquisition request has been received from the smartphone 200, which is a registration device, but the present disclosure is not limited thereto. For example, in a case where the management information acquisition request related to the ink remaining amount is generated from a device such as a host PC or the smartphone 200, the reset operation of the management information related to the ink remaining amount may be restricted without checking the registration device information. Further, the reset operation of the management information related to the ink remaining amount may be restricted by checking ability information of the operation panel 340, and restricting the management information related to the ink remaining amount to only a limited case where the reset operation of the management information related to the ink remaining amount cannot be guided sufficiently to the user.

Further, in the present embodiment, the period of restricting the reset operation of the management information related to the ink remaining amount is until the reset command is transmitted (issued) from the smartphone 200, but the present disclosure is not limited thereto. For example, a time-out period is set, and when a reset command is not transmitted (issued) within the period, the reset operation restriction of the management information related to the ink remaining amount may be canceled.

As described above, in the second embodiment, in step S805, the data transmission/reception unit 421 of the printer 300 serving as an example of an image processing apparatus transmits the management information of the printer 300 to the smartphone 200 serving as an example of an information processing apparatus. Further, in the second embodiment, the data transmission/reception unit 421 of the printer 300 receives the reset command, which is a control command related to the management target of the printer 300 generated based on the management information in the smartphone 200 (YES in step S806). Then, in the second embodiment, in step S805, the printer 300 restricts the reset operation of the management information during the time period from the transmission of the management information from the data transmission/reception unit 421 to the reception of the control command.

With such a configuration, the printer 300 can appropriately manage the management target. More specifically, according to the second embodiment, in a case where a predetermined condition is satisfied when an ink warning or an ink error has occurred, it is possible to suppress a user's erroneous operation by restricting the reset operation of the management information related to the ink remaining amount from the operation panel 340.

OTHER EMBODIMENTS

In addition, in the above-described first and second embodiments, the ink (consumable good) of the ink unit is employed as the management target of the printer 300, and the information related to the ink remaining amount is employed as the management information of the printer 300, but the present disclosure is not limited thereto. For example, an embodiment, in which ink reserved in a maintenance cartridge is employed as a management target of the printer 300, and information related to an ink storage amount in the maintenance cartridge is employed as the management information of the printer 300, can be included in the present disclosure. Further, an embodiment, in which a battery (consumable good) is employed as a management target of the printer 300, and information related to a charge amount of the battery is employed as the management information of the printer 300, can be included in the present disclosure.

The present disclosure can be realized by processing of supplying a program for implementing one or more functions of the above-described embodiments to a system or an apparatus via a network or a storage medium, and one or more processors in a computer of the system or the apparatus reading and executing the program. Further, the present disclosure can also be realized by a circuit (e.g., application specific integrated circuits (ASIC)) that can implement one or more functions.

The program and the computer-readable storage medium storing the program are included in the present disclosure.

In addition, all the above-described embodiments are merely examples of the present disclosure and shall not be construed as limiting the technical range of the present disclosure. The present disclosure can be realized in diverse ways so long as it is in accordance with the technological thought or main features of the present disclosure.

According to the present disclosure, the image processing apparatus can appropriately manage the management target.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-048778, filed Mar. 24, 2023, which is hereby incorporated by reference herein in its entirety.

What is claimed is:

1. An information processing apparatus configured to communicate with an image processing apparatus, the information processing apparatus comprising:

an information acquisition unit configured to acquire management information of the image processing apparatus from the image processing apparatus;

an image acquisition unit configured to acquire an image of a management target of the image processing apparatus captured based on the management information; and a transmission unit configured to transmit a control command related to the management target to the image processing apparatus, based on an analysis result of the image of the management target, wherein the transmission unit transmits a reset command of the management information as the control command.

2. The information processing apparatus according to claim 1, wherein the management target is a consumable good, and wherein the management information is information related to a remaining amount of the consumable good.

3. The information processing apparatus according to claim 2, further comprising an analysis unit configured to analyze an image of the consumable good serving as the management target, wherein the analysis unit analyzes the remaining amount of the consumable good from the image of the consumable good, and wherein the transmission unit transmits the control command related to the consumable good to the image processing apparatus, based on an analysis result of the remaining amount of the consumable good by the analysis unit.

4. The information processing apparatus according to claim 2, wherein the consumable good is ink.

5. The information processing apparatus according to claim 1, further comprising a display unit configured to display the management information.

6. The information processing apparatus according to claim 1, further comprising an image capturing unit configured to capture the image of the management target.

7. The information processing apparatus according to claim 6, wherein the image capturing unit captures the image including a marker for identifying the management target, together with the management target.

8. An image processing apparatus configured to communicate with an information processing apparatus, the image processing apparatus comprising:

a transmission unit configured to transmit management information of the image processing apparatus to the information processing apparatus;

a reception unit configured to receive a control command related to a management target of the image processing apparatus, generated in the information processing apparatus based on the management information; and a control unit configured to restrict a reset operation of the management information during a period from a transmission of the management information by the transmission unit to a reception of the control command by the reception unit.

9. The image processing apparatus according to claim 8, wherein the management target is a consumable good, and wherein the management information is information related to a remaining amount of the consumable good.

10. The image processing apparatus according to claim 9, wherein the consumable good is ink.

11. The image processing apparatus according to claim 8, further comprising a marker for identifying the management target.

12. A processing system, comprising:

an information processing apparatus and an image processing apparatus configured to communicate with the information processing apparatus, the information processing apparatus comprising:

an information acquisition unit configured to acquire management information of the image processing apparatus from the image processing apparatus;

an image acquisition unit configured to acquire an image of a management target of the image processing apparatus captured based on the management information; and a transmission unit configured to transmit a control command related to the management target to the image processing apparatus, based on an analysis result of the image of the management target, and the image processing apparatus comprising:

a transmission unit configured to transmit management information of the image processing apparatus to the information processing apparatus;

a reception unit configured to receive a control command related to a management target of the image processing apparatus, generated in the information processing apparatus based on the management information; and a control unit configured to restrict a reset operation of the management information during a period from a transmission of the management information by the transmission unit to a reception of the control command by the reception unit.

* * * * *